United States Patent [19]

Hwang

[11] 4,200,304
[45] Apr. 29, 1980

[54] TWISTING CAR

[76] Inventor: Chuang-Li Hwang, No. 7, Lane 222 See. 1, Hsi-Tun Rd., Taichung, Taiwan

[21] Appl. No.: 923,800

[22] Filed: Jul. 12, 1978

[51] Int. Cl.² ........................................... B62M 29/00
[52] U.S. Cl. ................................. 280/218; 280/87.01
[58] Field of Search ............... 280/218, 1.181, 267, 280/268, 269, 282, 87.01

[56] References Cited

U.S. PATENT DOCUMENTS

| | | | |
|---|---|---|---|
| 2,986,406 | 5/1961 | Kahl | 280/267 |
| 3,663,038 | 5/1972 | Hendricks | 280/218 |
| 3,794,351 | 2/1974 | Cudmore | 280/282 |
| 3,863,950 | 2/1975 | Jordan | 280/218 |

*Primary Examiner*—Joseph F. Peters, Jr.
*Assistant Examiner*—Donn McGiehan
*Attorney, Agent, or Firm*—Blair, Brown & Kreten

[57] ABSTRACT

This invention is to provide a kind of sporting toy car for children, which mainly raises children's interest in toys of this type and provides a wholesome physical exercise for children playing with it to promote their growth.

9 Claims, 6 Drawing Figures

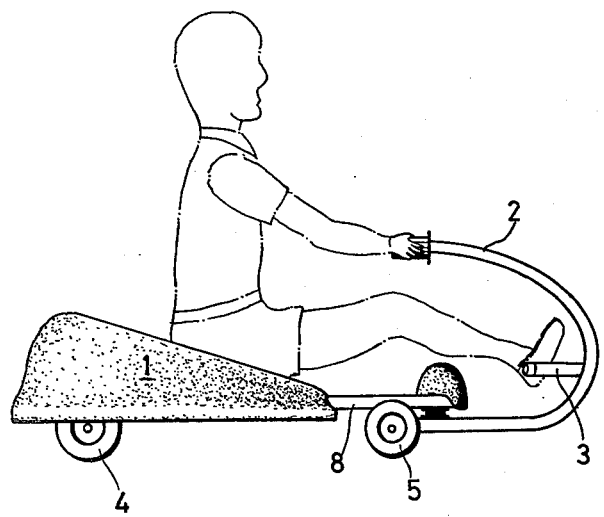
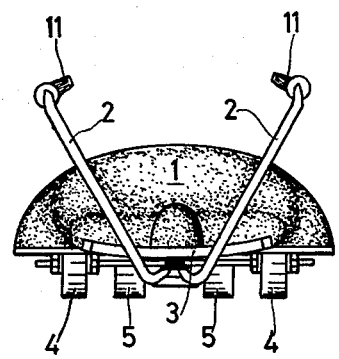
Fig. 5     Fig. 4
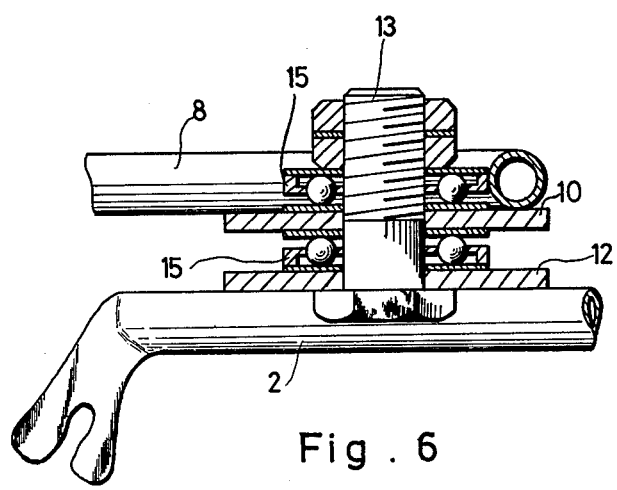
Fig. 6

TWISTING CAR

BACKGROUND OF THE INVENTION

Most of the current toy cars for children are made similar to a general automobile or three-wheel car. They are driven ahead by feet pedaling or by hands. As a result, they can not provide a balanced development for children's growth since they merely exercise their hands or feet without exercising their main bodies. Furthermore, such driving exercise has made children tired of the toys. This invention is a kind of novelty toy car designed to overcome the above-mentioned weak points and can be driven ahead along a wavelike track merely by hands oscillating with a child's twisting body. Such a driving technique certainly will appeal to children's curiosities and is an excellent aide to the growth and development for children due to a complete physical exercise in its operation.

SUMMARY OF THE INVENTION

This invention is a kind of sporting car provided for entertainment, which has four wheels; the front ones are fixed on both ends of an axle and may each rotate freely. Also the axle of the two front wheels is fixed on the handle and may rotate about a point when the handle is twisted. The handle is mounted on a car body by means of pivot, and while in driving, it is twisted by means of manual control to make the care body drive ahead along a wavelike track since the front wheels turn from side to side while the handle is twisted. As a result, the child will fully enjoy such entertainment due to complete physical twisting while driving the car.

BRIEF DESCRIPTION OF THE DRAWINGS

FIG. 4 is a front view of the front side of the car body;

FIG. 5 is a side view of a driver in the car; and

FIG. 6 is an enlarged view of part B in FIG. 2.

DESCRIPTION OF THE PREFERRED EMBODIMENT

Figure 1:
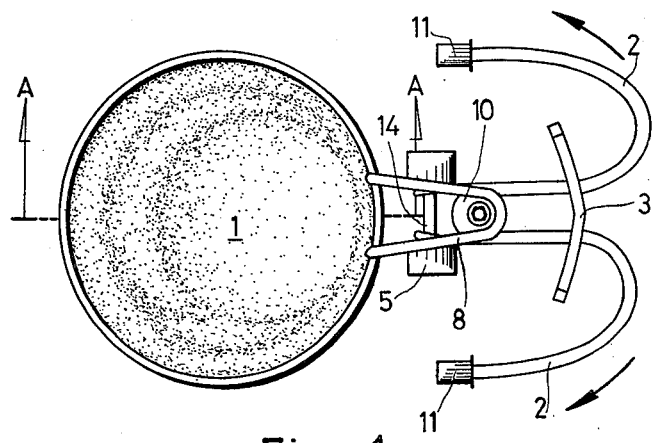
FIG. 1 is a top view showing the construction of the car body and the moving capability of the handle.
Figure 2:
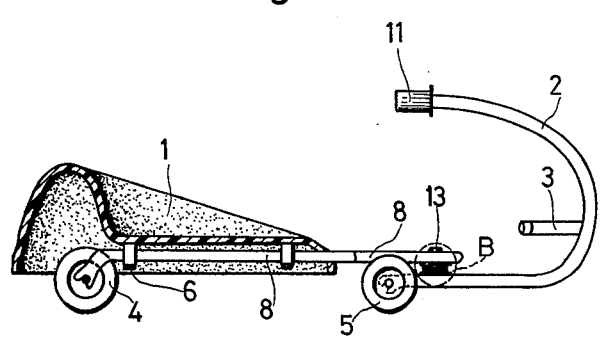
FIG. 2 is a sectional view along the dotted line A—A of FIG. 1 showing the details of the car body and wheels.
Figure 3:
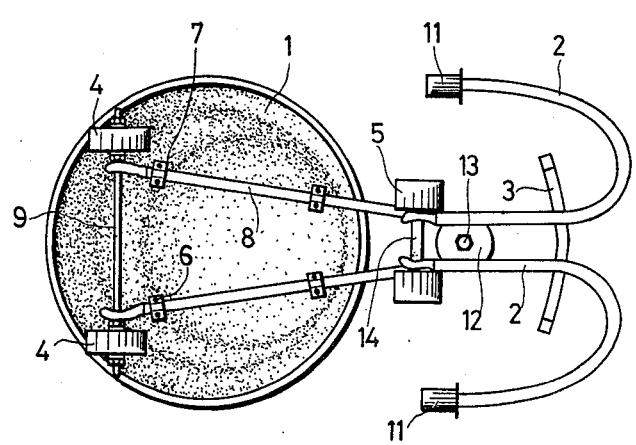
FIG. 3 is a bottom view showing the further details of the car body and car wheels.

The substantial components of this invention are as follows:

The seat cushion 1 is fastened on frame 8 by means of a screw set 6 and fastener 7. Frame 8 is substantially V-shaped (as shown in FIG. 3). At the rear end, this frame 8 is connected with a rear wheel axle 9 which has rear wheels 4 at both ends. These two rear wheels 4 rotate freely around rear wheel axle 9; and a support 10 is jointed at the front of the frame, and support 10 has a hole for being mounted with handle 2. Handle 2 is fastened to transverse pole 3 and joint 12. Handle 2 mounts under the frame 8 by means of a pivot bolt 13 passing through support 10 and joint 12. Bearings 15 (as shown on FIG. 6) go between handle 2 and frame 8 so that they may turn freely. The distance between handles near handgrips 11 is at a minimum. There is a front wheel axle 14 set at the end of handle 2 close to pivot bolt 13, where there are mounted front wheels 5 at either end of the front wheel axle such that the front wheels rotate freely. The diameters of the front wheels are smaller than that of the rear wheels 4. Front wheels 5 are set near pivot bolt 13 and between the rear wheels.

In operation the structural features mentioned above work as follows:

As shown in FIG. 5, a driver is sitting on seat cushion 1 with his feet on transverse pole 3. Hands are grabbing onto handle grips 11 to rotate them around to also meet the twisting body. As a result, while hand grips 11 move toward the left, the car body is moving to the left, and the wheelbase from the right front wheel to the right rear wheel is longer. Similarly while rotating handle grips toward the right, the car will move along to the right, and the wheelbase of left front wheel to the left rear wheel are longer and the car body keeps moving toward the right. According to such movement to the right and left in accordance with the driver's twist and the fundamental laws of motion, the car body will go ahead in a wavelike manner.

Having thus described the preferred embodiment of the invention it should be understood that numerous structural modifications and adaptations may be resorted to without departing from the spirit of the invention.

I claim:

1. A toy car which moves in a wavelike pattern due to a driver's twisting motion comprising in combination:
    a frame which supports the car,
    a pair of handles connected to a front portion of the frame through a pivot bolt,
    a wheeled first axle interconnecting a terminal rearward portion of said frame,
    and a wheeled second axle interconnecting said pair of handles at an area between said pivot bolt and said wheeled first axle whereby rotation of said handles rotates said wheeled second axle about said pivot bolt and thus the car moves in a serpentine manner.

2. The car of claim 1 in which said pivot bolt is affixed to said frame through a bearing, and joint type plates are fastened to a bottom face of the frame and a top face of the handles around said pivot bolt, and a second bearing separates said joint type plates to provide pivoting action.

3. The car of claim 2 in which a transverse bar interconnects said handles and serves as a foot support forward of the pivot bolt and substantially in a same horizontal plane whereby the feet can assist in rotating the handles.

4. The device of claim 3 in which said frame is substantially V-shaped and diverges rearwardly from said pivot bolt.

5. The device of claim 4 in which said first wheeled axle is longer than said second wheeled axle.

6. The toy of claim 5 in which wheels on said first wheeled axle have a greater diameter than wheels of said second wheeled axle.

7. The device of claim 6 in which said frame supports a seat thereon.

8. The device of claim 7 in which said handles have a substantially "C" shape configuration when viewed from a side of the car and a lower portion which together define a pair of laterally spaced substantially parallel bars which flare and diverge upwardly and outwardly with a concave portion facing the rear of the car; whereby said handles and foot rests can provide a turning moment on said second axle about the pivot.

9. The device of claim 8 in which said axles mount on said frame and handles by sliding onto bifurcated extremities of said frame and handles.

* * * * *